US007376562B2

(12) United States Patent
Large

(10) Patent No.: US 7,376,562 B2
(45) Date of Patent: May 20, 2008

(54) METHOD AND APPARATUS FOR NONLINEAR FREQUENCY ANALYSIS OF STRUCTURED SIGNALS

(75) Inventor: Edward W. Large, Boca Raton, FL (US)

(73) Assignees: Florida Atlantic University, Boca Raton, FL (US); Circular Logic, Inc., Boca Raton, FL (US)

( * ) Notice: Subject to any disclaimer, the term of this patent is extended or adjusted under 35 U.S.C. 154(b) by 148 days.

(21) Appl. No.: 10/873,896

(22) Filed: Jun. 22, 2004

(65) Prior Publication Data

US 2005/0283360 A1 Dec. 22, 2005

(51) Int. Cl.
*G10L 15/08* (2006.01)

(52) U.S. Cl. ...................... 704/236; 704/207; 704/205; 704/209

(58) Field of Classification Search ........ 704/202-206, 704/216-218, 232, 259, 207, 236, 209; 706/26, 706/15

See application file for complete search history.

(56) References Cited

U.S. PATENT DOCUMENTS

| | | | | |
|---|---|---|---|---|
| 5,751,899 | A * | 5/1998 | Large et al. | 704/207 |
| 6,253,175 | B1 | 6/2001 | Basu et al. | |
| 6,316,712 | B1 | 11/2001 | Laroche | |
| 6,957,204 | B1 * | 10/2005 | Hoppensteadt et al. | 706/26 |
| 2002/0178012 | A1 | 11/2002 | Wang et al. | |
| 2003/0065517 | A1 | 4/2003 | Miyashita et al. | |

OTHER PUBLICATIONS

Brown, J.C. (1993). "Determination of the meter of musical scores by autocorrelation." Journal of the Acoustical Society of America, 94: 1953-1957.

Hoppensteadt, F.C. and E.M. Izhikevch (1996). "Synpatic organizations and dynamical properties of weakly connected neural oscillators I: Analysis of a cannonical model."

Rauschecker, J.P. and R.V. Shannon (2002). "Sending sound to the brain." Science 295: 1025-1029.

Wilson, H.R. and J.D. Cowan (1973). "A mathematical theory of the functional dynamics of cortical and thalamic nervous tissue." Kybernetik. 13: 55-80.

Eguiluz, et al, "Essential Nonlinearities in Hearing", The American Physical Society, vol. 84, No. 22, May 29, 2000, pp. 5232-5235.

Kern, et al., "Essential Role of Couplings Between Hearing Nonlinearities", The American Physical Society, vol. 91, No. 12, Sep. 19, 2003, pp. 128101-3 to 128101-4.

* cited by examiner

*Primary Examiner*—Huyen Vo
(74) *Attorney, Agent, or Firm*—Darby & Darby; Robert J. Sacco

(57) ABSTRACT

The present invention relates to systems and methods for processing acoustic signals, such as music and speech. The method involves nonlinear frequency analysis of an incoming acoustic signal. In one aspect, a network of nonlinear oscillators, each with a distinct frequency, is applied to process the signal. The frequency, amplitude, and phase of each signal component are identified. In addition, nonlinearities in the network recover components that are not present or not fully resolvable in the input signal. In another aspect, a modification of the nonlinear oscillator network is used to track changing frequency components of an input signal.

37 Claims, 9 Drawing Sheets

METHOD AND APPARATUS FOR NONLINEAR FREQUENCY ANALYSIS OF STRUCTURED SIGNALS

STATEMENT REGARDING FEDERALLY SPONSORED RESEARCH OR DEVELOPMENT

The United States Government has rights in this invention pursuant to Contract No. BCS-0094229 between the National Science Foundation and Florida Atlantic University.

BACKGROUND OF THE INVENTION

1. Statement of the Technical Field

The present application relates generally to the perception and recognition of signals input and, more particularly, to a signal processing method and apparatus for providing a nonlinear frequency analysis of structured signals.

2. Description of the Related Art

In general, there are many well-known signal processing techniques that are utilized in signal processing applications for extracting spectral features, separating signals from background sounds, and finding periodicities at the time scale of music and speech rhythms. Generally, features are extracted and used to generate reference patterns (models) for certain identifiable sound structures. For example, these sound structures can include phonemes, musical pitches, or rhythmic meters.

Referring now to FIG. 1, a general signal processing system in accordance with the prior art is shown. The processing system will be described relative to acoustic signal processing, but it should be understood that the same concepts can be applied to processing of other types of signals. The processing system 100 receives an input signal 101. The input signal can be any type of structured signal such as music, speech or sonar returns.

Typically, an acoustic front end (not shown) includes a microphone or some other similar device to convert acoustic signals into analog electric signals having a voltage which varies over time in correspondence to the variation in air pressure caused by the input sounds. The acoustic front end also includes an analog-to-digital (A/D) converter for digitizing the analog signal by sampling the voltage of the analog waveform at a desired sampling rate and converting the sampled voltage to a corresponding digital value. The sampling rate is typically selected to be twice the highest frequency component in the input signal.

In processing system 100, spectral features can be extracted in a transform module 102 by computing a wavelet transform of the acoustic signal. Alternatively, a sliding window Fourier transform may be used for providing a time-frequency analysis of the acoustic signals. Following the initial frequency analysis performed by transform module 102, one or more analytic transforms may be applied in an analytic transform module 103. For example, a "squashing" function (such as square root) may be applied to modify the amplitude of the result. Alternatively, a synchro-squeeze transform may be applied to improve the frequency resolution of the output. Transforms of this type are described in U.S. Pat. No. 6,253,175 to Basu et al. Next, a cepstrum may be applied in a cepstral analysis module 104 to recover or enhance structural features (such as pitch) that may not be present or resolvable in the input signal. Finally, a feature extraction module 105 extracts from the fully transformed signal those features which are relevant to the structure(s) to be identified. The output of this system may then be passed to a recognition system that identifies specific structures (e.g. phonemes) given the features thus extracted from the input signal. Processes for the implementation of each of the aforementioned modules are well-known in the art of signal processing.

Referring next to FIG. 2, a general beat detection system in accordance with the prior art is shown. As in FIG. 1, an acoustic signal 201 is digitally sampled, and (optionally) submitted to a frequency analysis module 202 as described previously. The resulting signal is then submitted to an onset detection module 203, which examines the time derivatives of the signal envelope to determine the initiation points of individual acoustic events, in a manner that is well known in the art of signal processing. The resulting onset signal is then submitted to an autocorrelation module 204, which determines the main time lag(s) at which event onsets are correlated in a manner that is well known in the art of signal processing. The foregoing technique is described in more detail in J. C. Brown, *Determination of the meter of musical scores by autocorrelation*, 94 Journal of the Acoustical Society of America, 1953-57 (1993). Alternatively, cross-correlation with a predetermined pulse train can produce a similar result as disclosed in U.S. Pat. No. 6,316,712 to Laroche. Finally, a structure identification module 205 determines the frequency and phase of the basic beat of the event sequence. Significantly, the foregoing system is mainly applicable to sequences whose tempo is steady, because a single frequency and phase is determined for an entire sequence.

Referring next to FIG. 3, a general beat tracking system is shown. An input signal 301 is presented as input to the system. The signal consists of onsets that can be determined in a manner described in the previous paragraph, or they can be extracted directly from a MIDI input signal, as is well known in the art. The onset signal is presented as input to a sparse bank of nonlinear oscillators 302, each of which has a distinct frequency. The relative oscillator frequencies are assumed to be known in advance, as is the base frequency. The frequency of the signal may change. The oscillator bank tracks changes in the phase and frequency of input signal, by adapting the phase and frequency of the oscillators in the oscillator bank. U.S. Pat. No. 5,751,899 to Large et al. describes a conventional beat tracking system of the prior art. An output signal 303 is then generated, either in the form of discrete beats (pulses) corresponding to the beat and metrical structure of the sequence or in the form of tempo change messages that describe changes in the tempo (frequency in beats per minute) of the sequence. The output signal can also be directly compared to the input signal (discrete events) to determine the correct musical notation (i.e. note durations) of the input events. Significantly, the applicability of this approach is limited to signals whose initial tempo and main frequency components are known in advance.

The foregoing audio processing techniques have proven useful in many applications. However, they have not addressed some important problems. For example, these conventional approaches are not always effective for determining the structure of a time varying input signal because they do not effectively recover components that are not present or not fully resolvable in the input signal.

SUMMARY OF THE INVENTION

The present invention is directed to systems and methods designed to ascertain the structure of acoustic signals. Such structures include the metrical structure of acoustic event sequences, and the structure of individual acoustic events, such as pitch and timbre. The approach involves an alternative transform of an acoustic input signal, utilizing a network of nonlinear oscillators in which each oscillator is tuned to a distinct frequency. Each oscillator receives input and interacts with the other oscillators in the network, yielding nonlinear resonances that are used to identify structures in an acoustic input signal. The output of the nonlinear frequency transform can be used as input to a system that will provide further analysis of the signal. According to one embodiment, the amplitudes and phases of the oscillators in the network can be examined to determine those frequency components that correspond to a distinct acoustic event, and to determine the pitch (if any) of the event.

With this method, an acoustic signal is provided as input to nonlinear frequency analysis, which provides all the features and advantages of the present nonlinear method. The result of this analysis can be made available to any system that will further analyze the signal. For example, these systems can include the human auditory system, an automated speech recognition system, or another artificial neural network.

In another aspect, the invention concerns a method for determining the beat and meter of a sequence of acoustic events. The method can include the step of performing a nonlinear frequency analysis to determine the frequencies and phases that correspond to the basic beat and meter of the sequence of acoustic events. With this method, the changing frequency components, corresponding to the beat and meter of the signal, are tracked through interaction with a second artificial neural network.

These and other aspects, features and advantages of the present apparatus and method will become apparent from the following detailed description of illustrative embodiments, which is to be read in conjunction with the accompanying drawings.

DETAILED DESCRIPTION OF PREFERRED EMBODIMENTS

Figure 1:
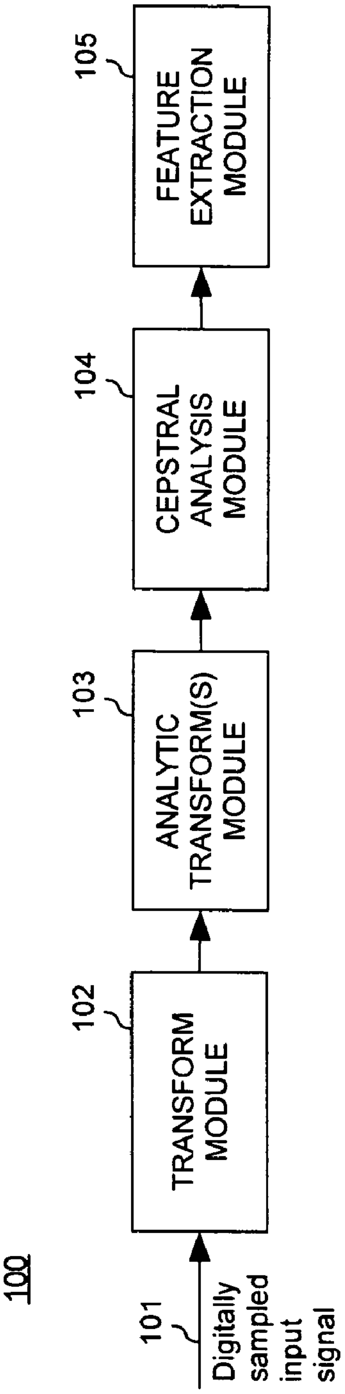
Fig. 1 (Prior Art)
FIG. 1 is a block diagram which illustrates the way in which linear frequency analysis is used in a variety of signal processing systems, in accordance with the prior art.

It is to be understood that the present invention may be implemented in various combinations of hardware, software, firmware, or a combination thereof. For example, the system modules described herein for processing acoustic signals can be implemented in software as an application program which is read into and executed by a general purpose computer having any suitable and preferred microprocessor architecture. The general purpose computer can include peripheral hardware such as one or more central processing units (CPUs), a random access memory, and input/output (I/O) interface(s).

The general purpose computer can also include an operating system and microinstruction code. The various processes and functions described herein relating may be either part of the microinstruction code or application programs which are executed via the operating system. In addition, various other peripheral devices may be connected to the computer, such as an additional data storage device and a printing device.

It is to be further understood that, because some of the constituent system components described herein are preferably implemented as software modules, the actual connections shown in the systems in the figures may differ depending upon the manner in which the systems are programmed. Further, those skilled in the art will appreciate that instead of, or in addition to, a general purpose computer system, special purpose microprocessors or analog hardware may be employed to implement the inventive arrangements. Given the teachings herein, one of ordinary skill in the related art will be able to contemplate these and similar implementations of configurations of the present system and method.

Finally, as will be understood by anyone skilled in the art, the nonlinear oscillator models described herein are presented in canonical form (i.e. normal form). Other nonlinear oscillator models meeting suitable constraints can be transformed into this normal form representation, and therefore will display the same properties as the system described below. H. R. Wilson & J. D. Cowan, *A mathematical theory of the functional dynamics of cortical and thalamic nervous tissue*, 13 KYBERNETIK, 55-80 (1973). F. C. Hoppensteadt & E. M. Izhikevich, *Weakly Connected Neural Networks*, New York: Springer (1997). Given the teachings herein, one of ordinary skill in the related art will be able to contemplate alternative neural network implementations that will amount to alternative configurations of the present invention.

Nonlinear Network for Identifying Amplitude and Phase of Frequency Components According to one embodiment, the invention concerns a network of nonlinear oscillators that can identify the frequency, amplitude, and phase of each component of a signal. In addition, however, the invention can generate frequency components that are not present in the input signal and/or not fully resolvable in the input signal due to noise or losses in the audio channel. The additional components arise in the network due to the nonlinearities described herein, and specific networks can be designed to determine structures relevant to specific types of signals, by choosing the network parameters appropriately. The foregoing capability is significant for several reasons.

One reason relates to the fact that the human auditory system is also a nonlinear system and is known to generate nonlinear distortions of the input signal, including harmonics, sub-harmonics, and difference tones, as discussed in Yost, W. A., *Fundamentals of Hearing*, San Diego: Academic Press, (2000). Auditory implants (e.g. cochlear implants and auditory brainstem implants, have been developed to assist individuals who have suffered a profound hearing loss. Such implants are discussed in J. P. Rauschecker & R. V. Shannon, *Sending sound to the brain*, 295 Science, 1025-29 (2002). For example, cochlear implants bypass damaged structures in the inner ear and directly stimulate the auditory nerve, allowing some deaf individuals to hear and learn to interpret speech and other sounds. However, many who use such implants find the quality of the perceived audio to be unnatural. For example, some have described the perceived quality of audio as causing human voices to sound artificial. Furthermore, speech recognition rates remain below those of individuals with normal hearing.

It is believed that the degraded nature of the auditory percept produced by auditory implants may be because the nonlinear components normally generated by the human auditory system are not similarly created in the case of conventional cochlear implants. Accordingly, systems that can generate nonlinear components that are not present or not fully resolvable in the input signal could be useful in the field of cochlear implants for producing a more natural perception of sound for users, and perhaps result in improved speech recognition. For example, the nonlinear network as described herein can be used to modify audio signals before they are communicated by an auditory implant to the human auditory nerve.

The ability to generate frequency components that are not present in the input signal and/or not fully resolvable in the input signal is also potentially useful in the speech recognition field. For example, in a noisy environment or one where the signal is subjected to a high degree of loss in a transmission channel, various frequency components of a human voice may be lost. It is believed that the human auditory system may inherently have the ability to generate some of these missing frequency components due to intrinsic nonlinearities, providing improved ability to understand speech. By providing a similar capability to computer speech recognition systems, it is anticipated that improved performance may be possible, particularly in noisy or lossy environments.

The ability to generate nonlinear distortions, coupled with the ability to track changing frequency components and patterns of frequency components in an input signal, is also useful in analyzing rhythms in music and speech. For example, in musical performance the tempo (frequency of the basic beat) often changes, while the meter (pattern of relative frequencies) remains the same. Humans are able track changes in rhythmic frequency (tempo), while maintaining the perception of invariant rhythmic patterns (meter), and this ability is believed to be important for temporal pattern recognition tasks including transcription of musical rhythm and interpretation of speech prosody. By creating computer-based rhythm tracking systems, it is anticipated that improved performance in a number of temporal pattern processing tasks, including the transcription of musical rhythm, may be achieved.

Broadly stated, the invention can be comprised of a nonlinear oscillator network that is described canonically by the dynamical equation:

$$\tau_n \dot{z}_n = z_n(a_n + b_n|z_n|^2) + F(z,D) + G(x(t),z,S) + \sqrt{Q}\zeta_n(t) \quad (1)$$

where $$z = z_1, \bar{z}_1, z_2, \bar{z}_2, \ldots z_N, \bar{z}_N$$

$$x = x_1(t), x_2(t), \ldots x_C(t)$$

Equation 1 describes a network of N oscillators. For the purposes of this description, and in the figures, it is assumed that oscillators in the network are evenly spaced in log frequency. However, the invention is not limited in this regard and other frequency spacing is also possible without altering the basic nature of this system.

In Equation 1, $z_n$ is the complex-valued state variable corresponding to oscillator n, and $\tau_n > 0$ is oscillator time scale (which determines oscillator frequency), $a_n$ and $b_n$ are complex-valued parameters, $a_n = \alpha_n + i\gamma_n$ and $b_n = \beta_n + i\delta_n$. The parameter $\alpha_n$ is a bifurcation parameter, such that when $\alpha_n < 0$ the oscillator exhibits a stable fixed point, and when $\alpha_n > 0$ the oscillator displays a stable limit cycle. $\gamma_n > 0$, together with $\tau_n$ (time scale, described above) determines oscillator frequency according to the relationship $f = \gamma_n/(2\pi\tau_n)$. Further, the parameter $\beta_n < 0$ is a nonlinearity parameter that (other things being equal) controls the steady state amplitude of the oscillation, causing a nonlinear "squashing" of response amplitude. Finally, $\delta_n$ is a detuning parameter, such that when $\delta_n \neq 0$, the frequency of the oscillation changes, where the change at any time depends upon the instantaneous amplitude of the oscillation.

The three additional terms in Equation 1, namely:

$$F(z,D) + G(x(t),z,S) + \sqrt{Q}\zeta_n(t)$$

represent respectively the internal network coupling, input stimulus coupling and internal noise. In order to better understand the significance of these terms, it is useful to refer to a visualization of the logical structure of the network which is illustrated in FIG. 4.

Figure 4:
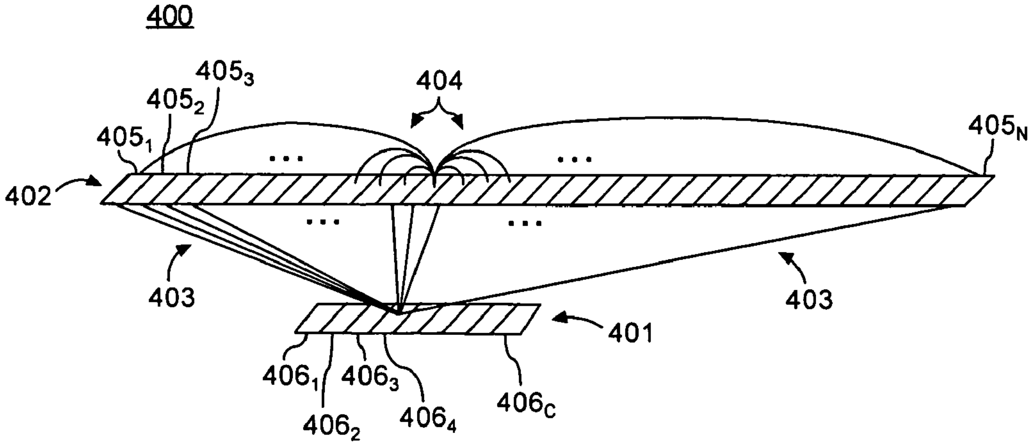
FIG. 4 is a diagram illustrating the basic structure of a nonlinear neural network and its relation to the input signal that is useful for understanding the invention.

As illustrated in FIG. 4, the system is comprised of a network 402 of nonlinear oscillators 405$_1$, 405$_2$, 405$_3$ . . . 405$_N$. An input stimulus layer 401 can communicate an input signal to the network 402 through a set of the stimulus connections 403. In this regard, the input stimulus layer 401 can include one or more input channels 406$_1$, 406$_2$, 406$_3$ . . . 406$_C$. The input channels can include a single channel of multi-frequency input, two or more channels of multi-frequency input, or multiple channels of single frequency input, as would be provided by a prior frequency analysis. The prior frequency analysis could include a linear method (Fourier transform, wavelet transform, or linear filter bank, methods that are well-known in the art) or another nonlinear network, such as another network of the same type.

Assuming C input channels as shown in FIG. 4, then the stimulus on channel 406$_c$ at time t is denoted $x_c(t)$, and the matrix of stimulus connections 403 is denoted in Equation 1 as S. S is a matrix of complex-valued parameters, each describing the strength of a connection from an input channel 406$_c$ to an oscillator 405$_n$, for a specific resonance, as explained below. Notably, the matrix S can be selected so that the strength of one or more of these stimulus connections is equal to zero.

Referring again to FIG. 4, internal network connections 404 determine how each oscillator $\mathbf{405}_n$ in the network 402 is connected to the other oscillators. These internal connections are denoted by D, where D is a matrix of complex-valued parameters, each describing the strength of the connection from one oscillator $\mathbf{405}_m$ to another oscillator $\mathbf{405}_n$, for a specific resonance, as explained next.

The coupling functions, F and G in Equation 1, describe the network resonances that arise in response to an input signal. Construction of the appropriate functions is well known to those versed in the art of nonlinear dynamical systems, but is briefly summarized here. Coupling functions are either derived from an underlying oscillator-level description or they can be engineered for specific applications. Coupling functions can be nonlinear, and are usually written as the sum of several terms, one for each resonance, r, in the set of nonlinear resonances, R, displayed by the network. For clarity in the following description, each resonance function is denoted by the frequency ratio (e.g. 1:1, 2:1, 3:2) that describes the resonance, using a parenthesized superscript. Thus, linear resonance is denoted by 1:1, resonance at the second harmonic by 2:1, a resonance at the second subharmonic by 1:2, and so forth.

$$F(z, D) = \sum_{r\in R} f_r(z, \bar{z}, D^{(r)})$$

$$= \sum_{m\neq n}^{N} d_{nm}^{(1:1)} z_m + \sum_{m\neq n}^{N} d_{nm}^{(2:1)} z_m^2 + \sum_{m\neq n}^{N} d_{nm}^{(1:2)} z_m \bar{z}_n + \dots$$

$$G(x(t), z, S) = \sum_{r\in R} g_r(x(t), \bar{z}, S^{(r)})$$

$$= \sum_{c}^{C} s_{nc}^{(1:1)} x_c(t) + \sum_{c}^{C} s_{nc}^{(2:1)} x_c^2(t) + \sum_{c}^{C} s_{nc}^{(1:2)} x_c(t)\bar{z}_n + \dots$$

For example, to describe a resonance at the first harmonic (ratio of response to stimulus frequency is 1:1), we use the linear function, $h_{nm}^{(1:1)}(z_m,z_n)=z_m$; to describe a resonance at the second harmonic (2:1), we use the nonlinear function $h_{nm}^{(2:1)}(z_m,z_n)=z_m^2$; to describe a resonance at the subharmonic 1:2, we use the nonlinear term $h_{nm}^{(1:2)}(Z_m,Z_n)=z_m \bar{z}_n$ (overbar denotes complex conjugate). In general, the function $h_{nm}^{(1:2)}(Z_m,Z_n)=z_m^p \bar{z}_n^{q-1}$ describes a resonance corresponding to the ratio p:q, although as is known in the art, analysis of certain oscillator-level models produces resonance terms that can be slightly more complex. The complete coupling term is then written as a weighted sum of the individual resonance terms. As is known in the art, nonlinear oscillators resonate at harmonics, subharmonics and rational ratios of their driving frequency, and for multi-frequency stimulation they produce additional resonances such as combination tones, as described by Cartwright, J. H. E., Gonzalez, D. L., and Piro, O., Universality in three-frequency resonances, 59, *Physical Review E*, 2902-2906 (1999). When writing the network in the form given by Equation 1, one generally includes only those terms for the functionally significant resonances (as is well-known in the art, the higher order resonances are generally functionally insignificant).

Finally, Equation 1, also includes a final term $\sqrt{Q}\zeta_n(t)$, which represents Gaussian white noise with zero mean and variance Q. Internal noise is also useful in this network, to help to destabilize unstable fixed points, adding flexibility in the network. For clarity, this term is not presented in the following equations, but noise should be understood to be present. In some applications, signal noise may be strong enough to take the place of an explicit Gaussian noise term.

In summary, Equation 1 describes a nonlinear network that (1) performs a time-frequency analysis of an input signal, with (2) active nonlinear squashing of response amplitude, and (3) frequency detuning, where (4) oscillations can be either active (self-sustaining) or passive (damped). Additionally, (5) stimulus coupling and internal coupling allow nonlinear resonances to be generated by the network, such that the network can be highly sensitive to temporal structures, including the pitch of complex tones and the meter of musical rhythms. The network can recognize structured patterns of oscillation, and the network can complete partial patterns found in the input.

This network differs form the prior art, for example U.S. Pat. No. 5,751,899 to Large et al., in a number of significant respects. First, the oscillators in this network are defined in continuous time, not discrete time, so the network can be applied directly to continuous time signals (shown in the first example, next). Second, the oscillators are tightly packed in frequency so that the operation performed by this network is a generalization of a linear time-frequency analysis (e.g. wavelet transform or sliding window Fourier analysis). This is to be distinguished from the system described in Large in which the frequencies of the oscillators of the network are set up in advance to be the nonlinear resonances that will arise in the current network. Thus, in the present invention, initial frequencies need not be known in advance, and individual oscillators need not adapt frequency. Further, the natural frequency spacing of the nonlinear oscillators in the present invention is advantageously selected such that there are at least about 12 oscillators per octave or more. Thus, regardless of the absolute frequency of the fundamental, and regardless of which nonlinear resonances are of interest in the signal, a nonlinear oscillator will be available that is close enough in frequency to be able to respond at the appropriate frequency.

Finally, the oscillations in this network need not be self-sustaining, rather the oscillators may operate in a passive mode. To implement the type of tempo tracking described by Large an additional mechanism is used to give rise to self-sustaining oscillations (see "Nonlinear network for tracking beat and meter," below).

EXAMPLES

For the examples presented herein, the internal resonances 1:1, 2:1, 1:2, 3:1, and 1:3 are used. For external input, only the linear resonance term (1:1) is used. These suffice to demonstrate the basic behavior of the network. The resulting equation is:

$$\tau_n \dot{z}_n = z_n(a_n + b_n|z_n|^2) + \sum_{m\neq n}^{N} d_{nm}^{(1:1)} z_m + \sum_{m\neq n}^{N} d_{nm}^{(2:1)} z_m^2 + \sum_{m\neq n}^{N} d_{nm}^{(1:2)} z_m \bar{z}_n + \sum_{m\neq n}^{N} d_{nm}^{(3:1)} z_m^3 + \sum_{m\neq n}^{N} d_{nm}^{(1:3)} z_m \bar{z}_n^2 + \sum_{c}^{C} s_{nc}^{(1:1)} x(t)_c \quad (2)$$

Following are two examples that illustrate the behavior of the network described by Equation 2. In each example, the frequencies of network oscillators $\mathbf{405}_1, \mathbf{405}_2, \mathbf{405}_3 \dots \mathbf{405}_N$ span four octaves, from 100 Hz to 1600 Hz, with 36 oscillators per octave. The parameters are $\tau_n=1/f_n$, $\alpha_n=-0.05$ $\gamma_n=2\pi$ $\beta_n=-1$ $\delta_n=0$.

Figure 5A:
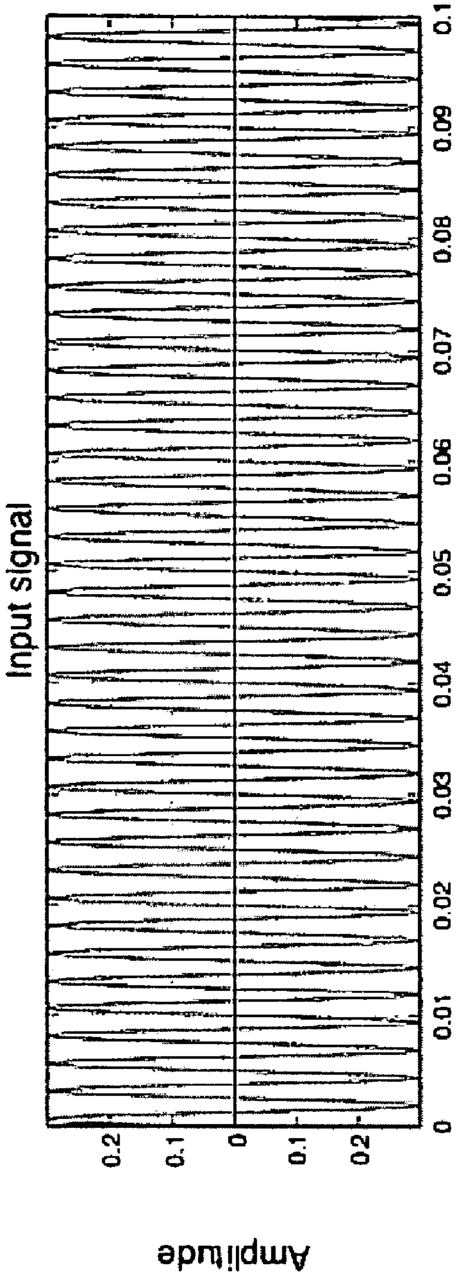
FIG. 5A shows a sinusoidal input signal.
Figure 5B:
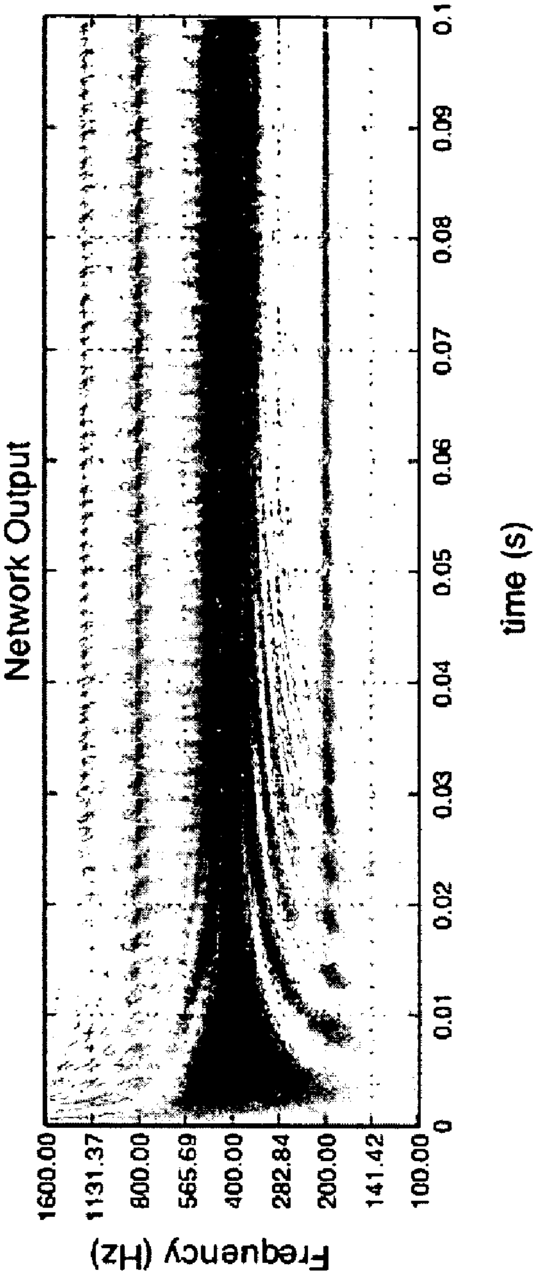
FIG. 5B is a graphical representation of a network output signal that can be produced from the input signal in FIG. 5A.

The connectivity matrices are given by:

$d_{nm}^{(r)}=1,\ 1\leq n\leq N,\ 1\leq m\leq N,\ \forall r$ $s_{nc}^{(1:1)}=1,\ 1\leq n\leq N,\ 1\leq c\leq C$ Referring now to FIG. 5A there is shown a pure tone input signal to the network with a frequency of 400 Hz. FIG. 5B illustrates the resulting oscillator output amplitude (i.e. phase is not displayed) as a function of time. A strong response can be seen at 400 Hz, and this is the only frequency that would be recovered by a linear frequency analysis (e.g. wavelet analysis), as is well known in the art. However, the nonlinear nature of the network as described herein also registers components at 800 Hz (2:1), 1200 Hz (3:1), 200 Hz (1:2) and a minimal response at 133 Hz (1:3). The relative strength of the nonlinear responses grows as signal amplitude grows. Such harmonic and sub-harmonic responses have been observed in the human auditory system.

Figure 6A:
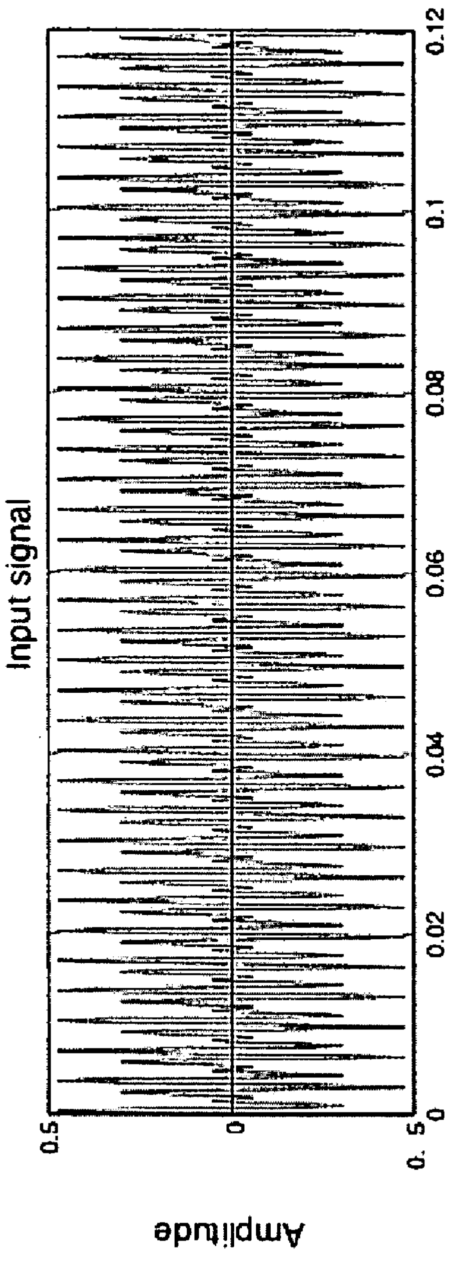
FIG. 6A shows an input signal that is a linear combination of two sinusoidal inputs.
Figure 6B:
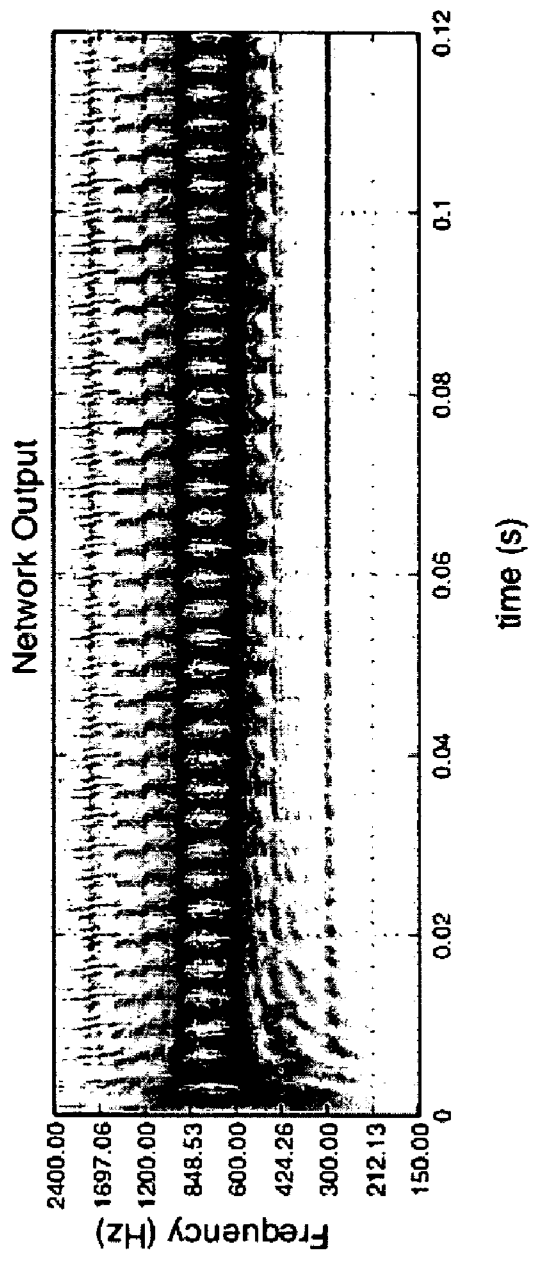
FIG. 6B is a graphical representation of a network output signal that can be produced from the input signal in FIG. 6A.

Referring now to FIG. 6A, a two-tone complex input signal is shown with component frequencies 600 and 900 Hz. The response of the nonlinear network described herein is shown in FIG. 6B. In addition to the main components (600 and 900 Hz), and various harmonics and sub-harmonics, it can be observed that a strong component at 300 Hz is also produced in the network output. The 300 Hz component corresponds to the pitch that humans and some animals perceive when exposed to this stimulus. Thus, in this aspect the invention can be used to simulate nonlinear behaviors of the human auditory system, including the perception of pitch.

Nonlinear Network for Tracking Beat and Meter

Figure 7:
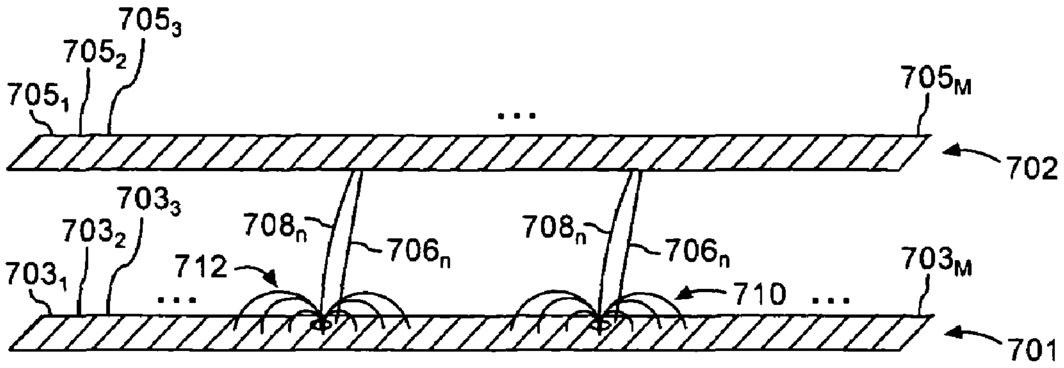
FIG. 7 is a block diagram illustrating the basic structure of a second embodiment of a nonlinear network arrangement that is useful for understanding the invention.

In a second embodiment of the invention, the nonlinear network of Equation 1 can be configured to interact with a second network, as illustrated in FIG. 7. The activity of the first network 701 of nonlinear oscillators 703$_1$, 703$_2$, 703$_3$, . . . 703$_M$ is fed forward via feed-forward connections 706$_n$ to a second network 702 of processing units 705$_1$, 705$_2$, 705$_3$, . . . 705$_M$. The second network 702 computes the amplitude of each oscillation from each nonlinear oscillator 703$_n$, and then feeds this amplitude back to the oscillator via feedback connection 708$_n$, in the form of a multiplicative connection. The multiplicative connection affects only connections from oscillators that are nearby in frequency (near a 1:1 ratio). A specific example of a coupling kernel that implements such a local connectivity restriction is described in the example, below. Such a configuration enables tracking of the amplitude and phase of components that comprise the basic beat and meter of a sequence of distinct acoustic events. In this embodiment the resulting behavior can be described canonically by the following dynamical equation:

$$\tau_n\dot{z}_n = z_n(a_n+b_n|z_n|^2) + |z_n|\sum_{m\neq n}^{N} d_{nm}^{(1:1)}z_m + \sum_{m\neq n}^{N} d_{nm}^{(2:1)}z_m^2 + \sum_{m\neq n}^{N} d_{nm}^{(1:2)}z_m\bar{z}_n + \sum_{m\neq n}^{N} d_{nm}^{(3:1)}z_m^3 + \sum_{m\neq n}^{N} d_{nm}^{(1:3)}z_m\bar{z}_n^2 + \sum_{c}^{C} s_{nc}^{(1:1)}x(t)_c \qquad (3)$$

The system described by Equation 3 is similar to the network described by Equation 2. The difference is that the linear part of the internal connectivity function is multiplied by $|z_n|$. This allows a self-sustaining oscillation to develop when the stimulus at frequency n is strong enough or persistent enough. Oscillator n (and its neighbors) will remain active until contradictory input is encountered.

In addition to the properties of the basic network, the above configuration adds the following properties: 1. Prediction. Self-sustaining oscillations arise and entrain to frequency components of the incoming signal, so that the oscillations come to predict the input signal. 2. Pattern generation. The network can complete partial patterns found in the input, and can actively generate or regenerate these patterns. 3. Pattern tracking. As the frequency components change, as with a musical rhythm changing tempo, the self-sustaining oscillations will "slide" along the length of the network to track the pattern. These basic properties combine to yield dynamic, real-time pattern recognition necessary for complex, temporally structured sequences. In the current document, we illustrate these properties using meter as an example. As shown in the following examples, this network combines the ability to determine the basic beat and meter of a rhythmic sequence, with the ability to track tempo changes in the rhythm, meaningfully extending the state of the art as referenced in U.S. Pat. No. 5,751,899 to Large et al.

A basic limitation of Large et al. is the need to specify in advance the frequency of the nonlinear oscillators of the network based on information about the specific tempo and meter of the sequence. The present invention solves this problem by providing a time frequency analysis using closely spaced nonlinear oscillators, e.g with oscillators having natural frequencies spacing that are at least about 12 per octave. The basic nonlinear oscillator network in Equation 1 herein performs a frequency analysis, such that initial frequencies need not be known in advance. Oscillations that are strong enough or persistent enough become self-sustaining through interaction with the second network, similar to the self sustaining oscillations in Large et al. Thereafter, phase and frequency are tracked by the self-sustaining oscillations in a manner that is a practical implementation for tracking tempo and meter for input signals for which advance information is not given. Still, those skilled in the art will readily appreciate that the invention is not limited in this regard. Instead, a dynamical system that obeys Equation 3 can be used in any instance where pattern recognition, completion and generation are desired.

Figure 2:
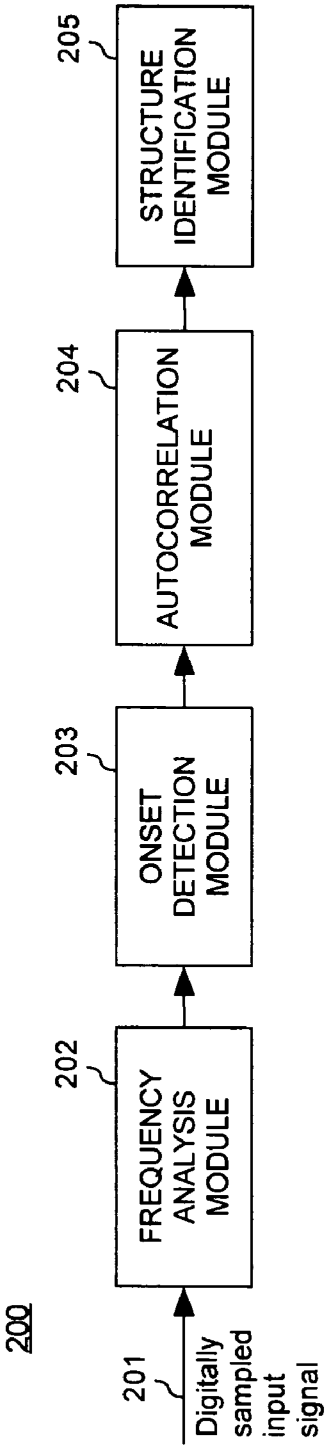
Fig. 2 (Prior Art)
FIG. 2 is a block diagram which illustrates a generalized beat detection system in accordance with the prior art.
Figure 3:
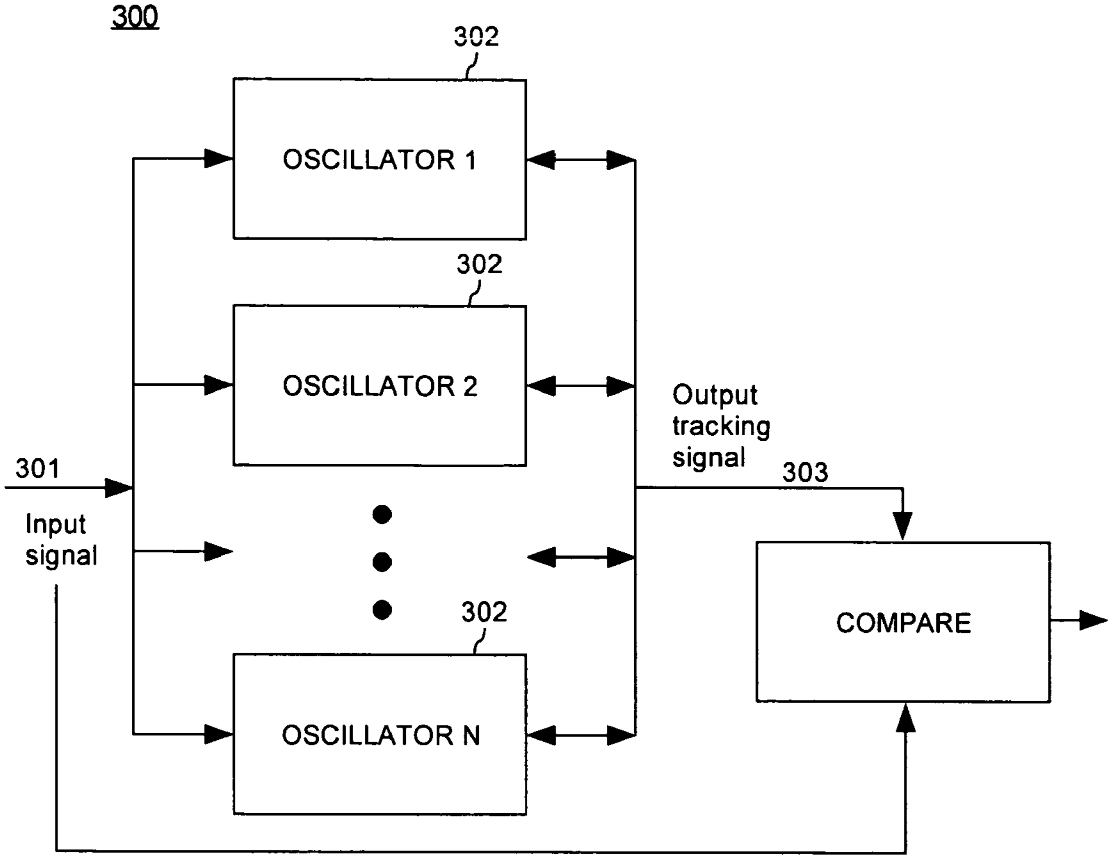
Fig. 3 (Prior Art)
FIG. 3 is a block diagram which illustrates a generalized beat tracking system in accordance with the prior art.

According to the inventive arrangements, frequency analysis can be performed on the acoustic signal, and an onset detection transform applied to determine the initiation of individual acoustic events across multiple frequency bands. These techniques are well known as previously described in relation to FIGS. 1 and 2. Alternatively, a MIDI signal can be provided as an input, from which onsets can be extracted directly. Next, the onsets are processed into form suitable for input to the network. For example, the network input can be in the form of an analog signal or digital data representative of the timing and amplitude of the onsets.

EXAMPLES

In order to more fully understand the behavior of a system described by Equation 2, several examples shall now be presented. In each case, the oscillator network frequencies span five octaves, from 0.5 Hz (period, □=2 ms) to 16 Hz (period, □=0.0625 ms), with 18 oscillators per octave. The parameters are as follows:

$\tau_n=1/f_n$ $\alpha_n=-1$ $\gamma_n=2\pi$ $\beta_n=-1$ $\delta_n=0$

The connectivity matrices, S and D, can be advantageously selected to be complex coupling kernels that restrict connectivity to those oscillators near the frequencies of interest. Importantly, for this example:

$$d_{nm}^{(1:1)}=wN(\log_2(f_m/f_n),0,\sigma)+iwN'(\log_2(f_m/f_n),0,\sigma/3),\quad \text{for } w=3.25,\ \sigma=0.25.$$

Figure 8:
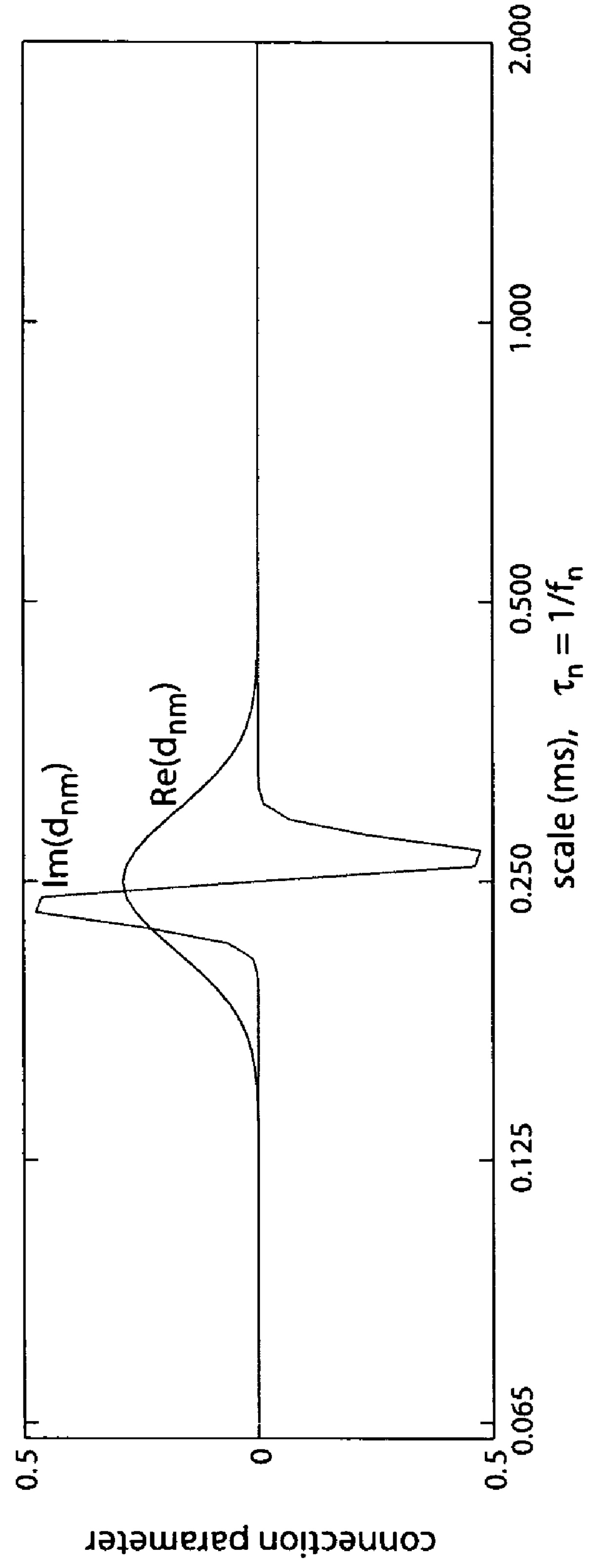
FIG. 8 The local coupling kernel used in the following examples, that restricts connectivity to those oscillators nearby in frequency.

N(x,μ,σ) is a Gaussian probability density function with mean μ and standard deviation σ, and N'(x,μ,σ is its first derivative. This kernel restricts the connectivity to oscillators nearby in frequency, and is shown in FIG. 8. This connectivity kernel is shown for the oscillator whose frequency, f=4 Hz (τ=0.25 s). The remaining coupling parameters can be selected as in the previous example. Resonance terms for 2:1, 1:2, 3:1 and 1:3 can be used as in the previous example. Still, those skilled in the art will readily appreciate that the invention is not limited to these specific parameters or these specific resonance terms. Instead, alternative parameters can be selected depending upon the nature of the input signal and the desired output.

In each of the following examples, an input signal is shown, along with the result produced by the network described herein. In each case, the acoustic signal has been pre-processed as described above to generate an analog signal or digital data that is representative of the timing and amplitude of the onsets in the acoustic signal.

Figure 9A:
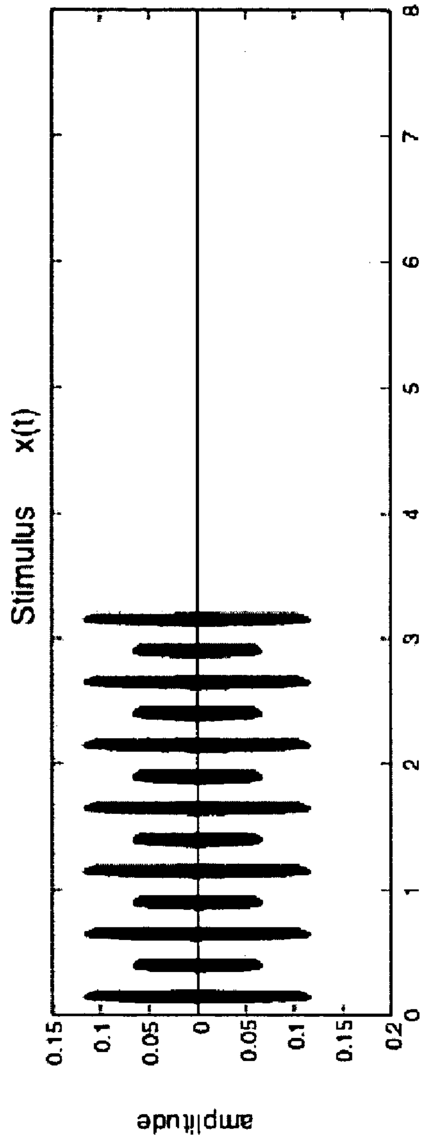
FIG. 9A shows an input signal that comprises a simple 2:1 metrical pattern.
Figure 9B:
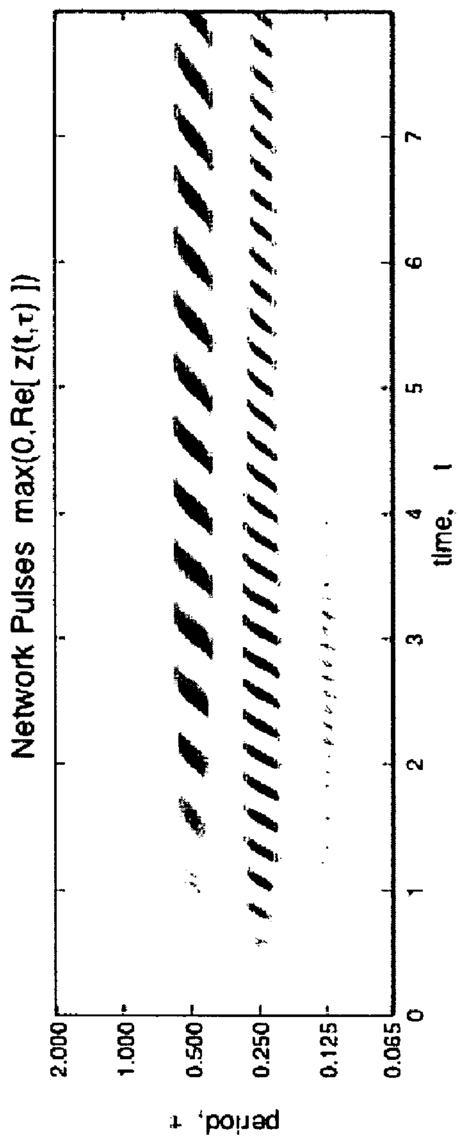
FIG. 9B is a graphical representation of a network output signal that can be produced from the input signal in FIG. 9A.

Referring now to FIG. 9A, the input signal is a sequence of acoustic events displaying a 2:1 relationship. The stimulus terminates slightly after t=3. The result of the network analysis is shown in FIG. 9B which indicates that two local populations of oscillators, embodying the 2:1 relationship, are activated. Note that the oscillators are phase locked to the stimulus, predicting it as long as the stimulus lasts, and they remain active after the stimulus ceases—this is the self-sustaining property.

Figure 10A:
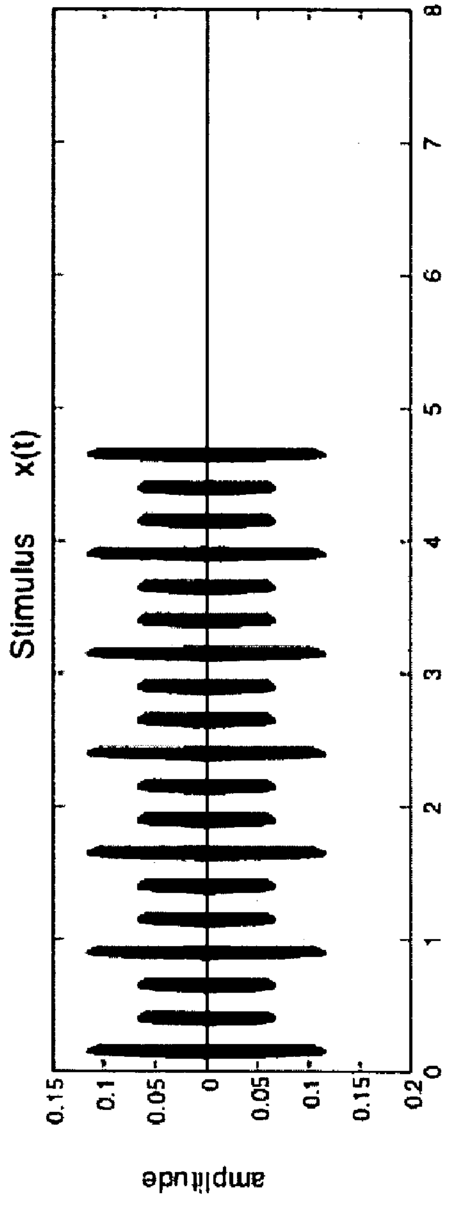
FIG. 10A shows an input signal that comprises a simple 3:1 metrical pattern.
Figure 10B:
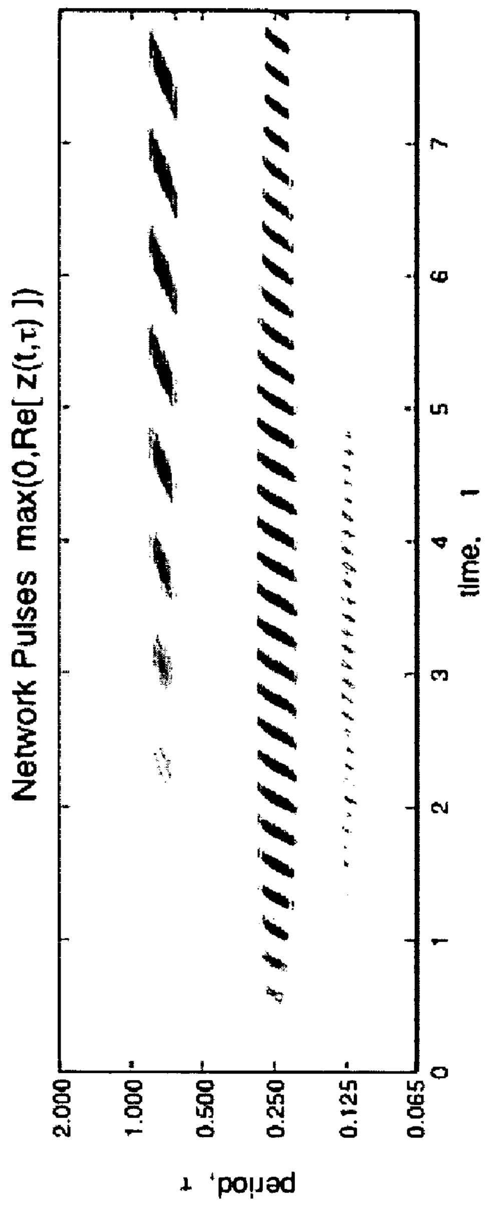
FIG. 10B is a graphical representation of a network output signal that can be produced from the input signal in FIG. 10A.

Referring now to FIG. 10A, the input is a sequence of acoustic events displaying a 3:1 relationship (¾ meter) and terminating at a value of t between 4 and 5. The result of the network analysis is shown in FIG. 10B. As can be seen from the output, two local populations of oscillators, embodying the 3:1 relationship, are activated. Note that the two local populations of oscillators are phase locked to the stimulus (and predict it) as long as the stimulus lasts, and they remain active after the stimulus is terminated.

Figure 11A:
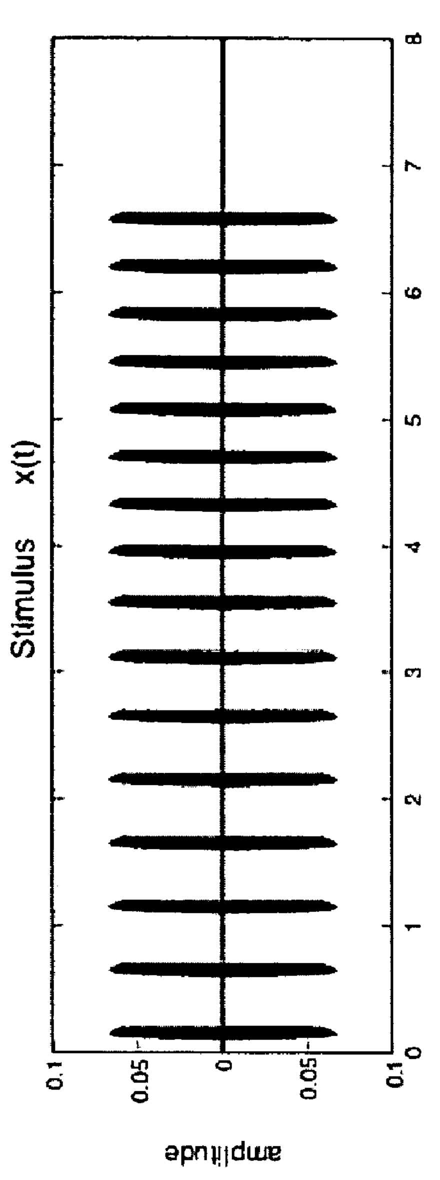
FIG. 11A shows a simple time metrical pattern with increasing tempo.
Figure 11B:
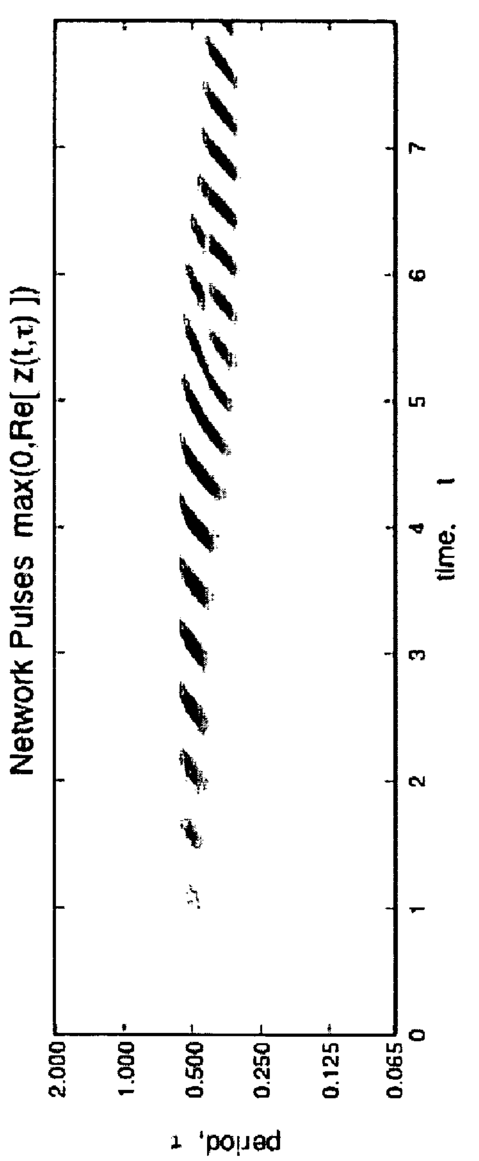
FIG. 11B is a graphical representation of a network output signal tracking the tempo change that can be produced from the input signal in FIG. 11A.

Finally, referring to FIG. 11A, the input is a periodic sequence of acoustic events whose tempo changes as the sequence progresses. Once again, referring to the network output in FIG. 11B it can be observed that a local population of oscillators is activated. Significantly, when the stimulus tempo begins to change, the activity slowly slides along the oscillator net, tracking the tempo change.

I claim:

1. A method for determining at least one frequency component that is present in an input signal having a time varying structure, comprising the step of:

converting an audio input signal to an electronic representation comprising a time varying input signal x(t);

communicating said time varying input signal x(t) to a network of N nonlinear oscillators, each having a different natural frequency of oscillation and obeying a dynamical equation of the form $$\tau_n \dot{z}_n = z_n(a_n + b_n|z_n|^2) + F(z, D) + G(x, z, S) + \sqrt{Q}\,\xi_n(t);$$

selecting a source of said time varying input signal exclusive of said network of nonlinear oscillators;

generating at least one frequency output from said network useful for describing said time varying structure, wherein said frequency output is at least one of (a) a frequency that is in the input signal, and (b) a frequency that is related to the input signal by an integer ratio other than a 1:1 ratio;

wherein $z_n$ is the complex-valued state variable corresponding to oscillator n; $\tau_n$ >0 is oscillator time scale, $a_n$ and $b_n$ are complex-valued parameters in which $a_n=\alpha_n+i\gamma_n$ and $b_n=\beta_n+i\delta_n$; $\alpha_n$ is a bifurcation parameter; $\gamma_n>0$, together with $\tau_n$ determines oscillator frequency according to the relationship $f=\gamma_n/(2\pi\tau_n)$; $\beta_n<0$ is a nonlinearity parameter; $\delta_n$ is a detuning parameter; F(z,D) defines the non-negligible internal network coupling among the non-linear oscillators having different frequencies; G(X(t),z,S) defines the input stimulus coupling and $\sqrt{Q}\xi_n(t)$ defines internal noise.

2. The method according to claim 1, wherein a plurality of non-linear resonances produced by said nonlinear network are selectively determined by assigning a matrix of connection parameters D, where each element of D is a complex-valued parameter that specifies the connection strength from one nonlinear oscillator to another nonlinear oscillator for a specific nonlinear resonance, and defining the function F(z,D) such that it gives rise to these nonlinear resonances.

3. The method according to claim 2, wherein said connection parameters in D define a plurality of links between said nonlinear oscillators that have respective frequencies that approximate rational ratios.

4. The method according to claim 1, further comprising the step of determining a plurality of nonlinear resonances produced by said nonlinear network by selectively assigning a matrix of input connection parameters $S_c$, where each element of S is a complex-valued parameter that describes the strength of the connection from one input channel to one nonlinear oscillator for a specific resonance, r, and defining the function G(x(t),z,S) such that it gives rise to these nonlinear resonances.

5. The method according to claim 1 further comprising the step of including in said output from said network a fundamental frequency of said time varying input signal and at least one nonlinear resonance that is not present in said time varying input signal.

6. The method according to claim 1 further comprising the step of including in said output from said network a fundamental frequency of said time varying input signal and at least one nonlinear resonance frequency that is present but not fully resolvable in said time varying input signal.

7. The method according to claim 1, further comprising the step of feeding forward the output from each of said nonlinear oscillators to a second network of processing units.

8. The method according to claim 7, further comprising the step of determining in said processing units an amplitude of oscillations produced by each of said nonlinear oscillators.

9. The method according to claim 8, further comprising the step of feeding back to selected ones of said nonlinear oscillators a signal indicating said amplitude.

10. The method according to claim 1 further comprising the step of multiplying a linear part of a coupling function F(z,D) in said network by the term by $|Z_n|$.

11. The method according to claim 1, further comprising selecting the function $$F(z,D)=\sum_{r\in R} f_r(z,\bar{z},D^{(r)})=\sum_{m\neq n}^{N} d_{mn}^{(1:1)}z_m+\sum_{m\neq n}^{N} d_{mn}^{(2:1)}z_m^2+\sum_{m\neq n}^{N} d_{mn}^{(1:2)}z_m\bar{z}_n+\ldots$$

where d is a complex valued connectivity parameter defined by a matrix D for describing a strength of a connection from one non-linear oscillator to another non-linear oscillator for a specific resonance.

12. The method according to claim 1, further comprising selecting the function $$G(x(t),z,S)=\sum_{r\in R} g_r(x(t),\bar{z},S^{(r)})=\sum_{c}^{C} s_{nc}^{(1:2)}x_c(t)+\sum_{c}^{C} s_{nc}^{(2:1)}x_c^2(t)+\sum_{c}^{C} s_{nc}^{(1:2)}x_c(t)\bar{z}_n+\ldots$$

where s is a complex value parameter defined by a matrix S describing the strength of a connection from an input channel to each said non-linear oscillator.

13. The method according to claim 1, further comprising selecting the function $$F(z,D)=\sum_{r\in R} f_r(z,z,D^{(r)})=\sum_{m\neq n}^{N} d_{mn}^{(1:1)}z_m+\sum_{m\neq n}^{N} d_{mn}^{(2:1)}z_m^2+\sum_{m\neq n}^{N} d_{mn}^{(1:2)}z_m\bar{z}_n+\ldots$$

where d is a complex valued connectivity parameter defined by a matrix D describing a strength of a connection from one non-linear oscillator to another non-linear oscillator for a specific resonance; and selecting the function $$G(x(t),z,S)=\sum_{r\in R} g_r(x(t),\bar{z},S^{(r)})=\sum_{c}^{C} s_{nc}^{(1:2)}x_c(t)+\sum_{c}^{C} s_{nc}^{(2:1)}x_c^2(t)+\sum_{c}^{C} s_{nc}^{(1:2)}x_c(t)\bar{z}_n+\ldots$$

where s is a complex value parameter defined by a matrix S describing the strength of a connection from an input channel to each said non-linear oscillator.

14. A method for processing a time varying input signal comprising the step of:

converting an audio input signal to an electronic representation comprising a time varying input signal x(t);

communicating said time varying input signal x(t) to a network of N nonlinear oscillators obeying a dynamical equation of the form $$\tau_n\dot{z}_n=z_n(a_n+b_n|z_n|^2)+|z_n|\sum_{m\neq n}^{N} d_{nm}^{(1:1)}z_m+\sum_{m\neq n}^{N} d_{nm}^{(2:1)}z_m^2+\sum_{m\neq n}^{N} d_{nm}^{(1:2)}z_m\bar{z}_n+\sum_{m\neq n}^{N} d_{nm}^{(3:1)}z_m^3+\sum_{m\neq n}^{N} d_{nm}^{(1:3)}z_m\bar{z}_n^2+\sum_{c}^{C} s_{nc}^{(1:1)}x(t)_c;$$

selecting a source of said time varying input signal exclusive of said network of nonlinear oscillators;

generating at least one output from said network, and using said at least one output to track at least one of a beat and a meter of said input signal, wherein each of said nonlinear oscillators has a different natural frequency of oscillation, and wherein $z_n$ is the complex-valued state variable corresponding to oscillator n; $\tau_n>0$ is oscillator time scale, $a_n$ and $b_n$ are complex-valued parameters in which $a_n=\alpha_n+i\gamma_n$ and $b_n=\beta_n+i\delta_n$; $\alpha_n$ is a bifurcation parameter; $\gamma_n>0$, together with $\tau_n$ determines oscillator frequency according to the relationship $f=\gamma_n/(2\pi\tau_n)$; $\beta_n<0$ is a nonlinearity parameter; $\delta_n$ is a detuning parameter;

$$|z_n|\sum_{m\neq n}^{N} d_{mn}^{(1:1)}z_m+\sum_{m\neq n}^{N} d_{mn}^{(2:1)}z_m^2+\sum_{m\neq n}^{N} d_{mn}^{(1:2)}z_m\bar{z}_n+\sum_{m\neq n}^{N} d_{mn}^{(3:1)}z_m^3+\sum_{m\neq n}^{N} d_{mn}^{(1:3)}z_m\bar{z}_n^2$$

defines non-negligible internal network coupling among the non-linear oscillators having different natural frequencies, where d is a complex valued connectivity parameter; and $$\sum_{c}^{C} s_m^{(1:1)}x(t)_c$$

defines input stimulus coupling as a function of time t for each of c input channels, where s is a complex value parameter describing the strength of a connection from an input channel to each said non-linear oscillator.

15. The method according to claim 14, further comprising the step of producing from said input signal a self-sustaining oscillation in at least one of said nonlinear oscillators in said network.

16. The method according to claim 15, further comprising the step of entraining said self-sustaining oscillations to frequency components of said time varying input signal.

17. The method according to claim 16, further comprising the step of predicting said time varying input signal with said self-sustaining oscillations.

18. The method according to claim 14, further comprising the step of tracking acoustic patterns in said time varying input signal by producing said self-sustaining oscillations in dynamically varying ones of said network of nonlinear oscillators responsive to variations in frequency components in said time varying input signal.

19. The method according to claim 14, further comprising the step of producing in said output a signal identifying at least one of a beat and a meter in a sequence of distinct acoustic events in said time varying input signal.

20. The method according to claim 14, further comprising the step of completing with said network of nonlinear oscillators partial patterns found in the time varying input signal and identifying said completed patterns in said output.

21. A method for processing a time varying signal, comprising the steps of:

converting an audio input signal to an electronic representation comprising a time varying input signal x(t);

communicating said time varying input signal to a network comprising a plurality of nonlinear oscillators, each having a different natural frequency spaced so that at least 12 or more frequencies are included per octave;

coupling an output of each of said plurality of nonlinear oscillators to at least one other one of said plurality of non-linear oscillators;

selecting a source of said time varying input signal exclusive of said plurality of nonlinear oscillators;

generating at least one frequency output from said network, wherein said frequency output is at least one of (a) a frequency that is in the time varying input signal, and (b) a frequency that is related to the input signal by an integer ratio other than a 1:1 ratio.

22. The method according to claim 21 further comprising the step of communicating a scaled output from at least a first one of said nonlinear oscillators of said network to at least a second one of said nonlinear oscillators in the network.

23. The method of claim 22 further comprising the step of deriving from said scaled output of said first oscillator a frequency approximately equal to a natural frequency of said second one of said nonlinear oscillators.

24. The method according to claim 23 further comprising the step of selecting said second nonlinear oscillator to which said scaled output is communicated to have a frequency ratio relative to said source oscillator equal to one of the group consisting of 2:1, 1:2, 3:1, and 1:3.

25. The method of claim 21 further comprising the step of feeding forward an output from each of said nonlinear oscillators in said network to a second network of processing units.

26. The method of claim 25 further comprising the step of determining in each of said processing units an amplitude of said oscillation produced by an associated one of said nonlinear oscillators.

27. The method of claim 26 further comprising the stop of feeding back said amplitude from each processing unit to an associated nonlinear oscillator in the form of a multiplicative connection that multiplies incoming signals to said nonlinear oscillator by said amplitude.

28. The method according to claim 21 wherein said output frequency is not present in said time varying input signal.

29. The method according to claim 21 wherein said output frequency is not fully resolvable in said time varying input signal.

30. The method according to claim 21, further comprising the step of producing a self-sustaining oscillation in at least one of said nonlinear oscillators in said network.

31. The method according to claim 21, further comprising the step of producing an output from said network that tracks at least one of a beat and a meter in a sequence of distinct acoustic events comprising said time varying input signal.

32. A network of nonlinear oscillators for processing a time varying signal, comprising:

at least one input channel communicating an input signal to a plurality of nonlinear oscillators, each having a different natural frequency spaced so that at least 12 or more frequencies are included per octave, said input channel having a first predetermined transfer function;

a plurality of coupling connections defined between said nonlinear oscillators for communicating nonlinear resonances generated by each nonlinear oscillator in said network to at least one other nonlinear oscillator in said network, each of said plurality of connections having a second predetermined transfer function;

wherein said input signal originates from a source exclusive of said plurality of nonlinear oscillators.

33. The network according to claim 32, wherein said network performs a time-frequency analysis of an input signal.

34. The network according to claim 33, wherein said network performs active nonlinear compression of response amplitude.

35. The network according to claim 33, wherein said nonlinear oscillators are at least one of self-sustaining and damped.

36. The network according to claim 33, wherein said network can identify at least one of beat, meter and frequency components in said input signal.

37. The network according to claim 36, wherein said network completes partial patterns found in said input signal.

* * * * *